Figure 1:
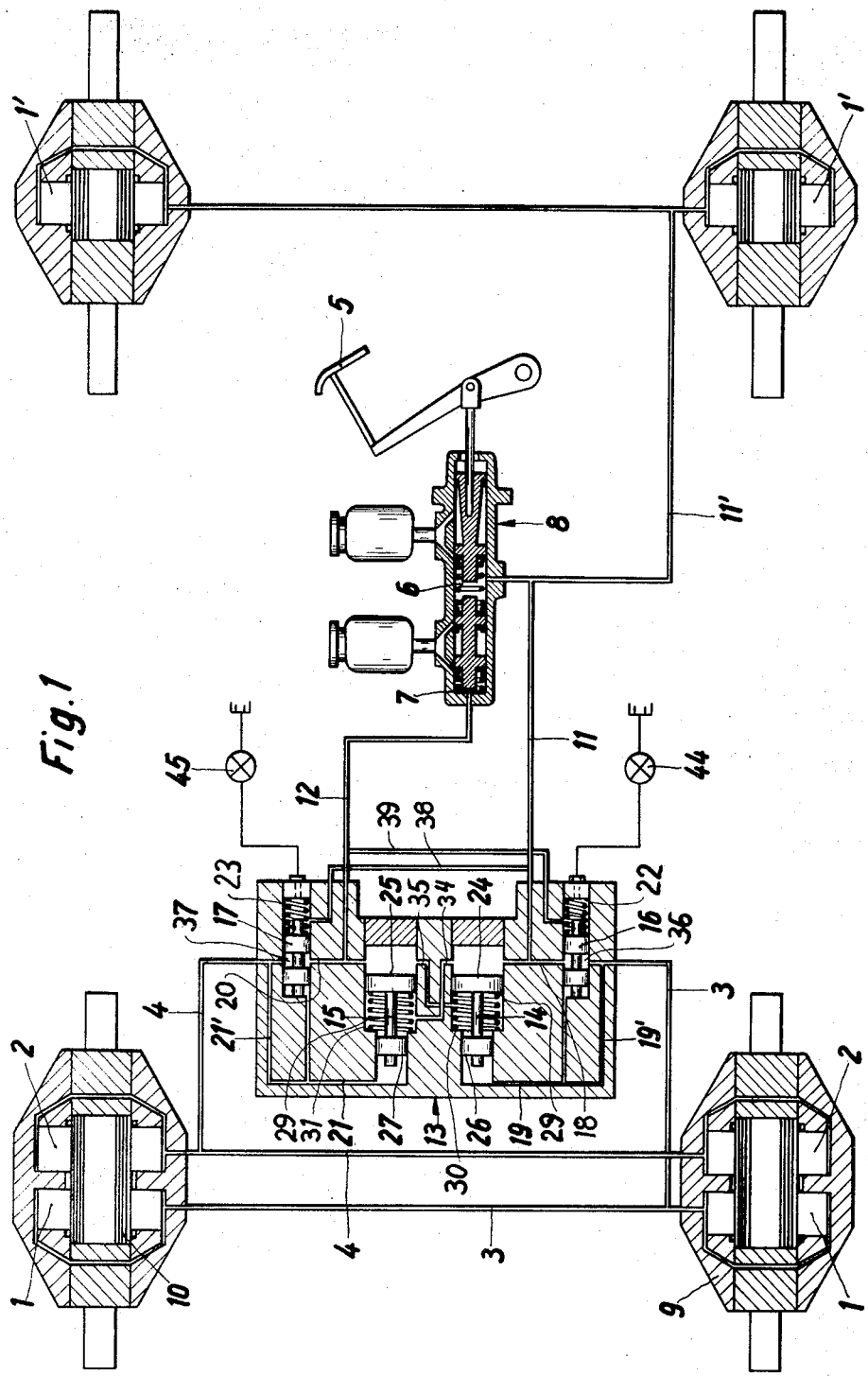

United States Patent [19]
Braun

[11] 3,760,912
[45] Sept. 25, 1973

[54] SAFETY SYSTEM FOR TWO-CIRCUIT BRAKE INSTALLATIONS OF MOTOR VEHICLES

[75] Inventor: Erich Braun, Rielinghausen, Germany

[73] Assignee: Dr. -Ing. h. c. F. Porsche KG, Stuttgart-Zuffenhausen, Germany

[22] Filed: Sept. 17, 1971

[21] Appl. No.: 181,385

[30] Foreign Application Priority Data
Sept. 18, 1970 Germany.................. P 20 46 135.2

[52] U.S. Cl........... 188/345, 60/54.5 E, 60/54.6 A, 188/151 A, 303/6 R, 303/84 A
[51] Int. Cl............................................. B60t 11/32
[58] Field of Search....................... 188/157 A, 345; 60/54.5 A, 54.5 E, 54.6 E, 54.6 A; 303/84 R, 84 A, 6 R

[56] References Cited
UNITED STATES PATENTS

| | | | |
|---|---|---|---|
| 3,472,559 | 10/1969 | Bueler............................ | 303/84 A X |
| 3,650,569 | 3/1972 | Kawabe et al.................. | 188/151 A |
| 3,486,591 | 12/1969 | Scheffler........................ | 188/345 X |

FOREIGN PATENTS OR APPLICATIONS

| | | | |
|---|---|---|---|
| 1,391,121 | 1/1965 | France.............................. | 188/345 |

*Primary Examiner*—George E. Halvosa
*Attorney*—Craig, Antonelli & Hill

[57] ABSTRACT

A safety installation for two-circuit brake installations of motor vehicles, in which two mutually independent brake circuits, of which each is equipped with its own line system and with independent wheel brake cylinders, is supplied with pressure fluid by a master brake cylinder constructed as tandem cylinder; a pressure amplifier element connected in the secondary circuit and a shifting element closing the main circuit are thereby coordinated to each brake circuit and are automatically adjusted in dependence on the pressure decrease in one of the brake circuits.

25 Claims, 3 Drawing Figures

SAFETY SYSTEM FOR TWO-CIRCUIT BRAKE INSTALLATIONS OF MOTOR VEHICLES

The present invention relates to a safety mechanism for two-circuit brake installations of motor vehicles in which two mutually independent brake circuits, of which each is equipped with its own line system and with independent wheel-brake cylinders, are supplied with pressure fluid by a master brake cylinder constructed as tandem-cylinder.

Hydraulic brake installations of motor vehicles are constructed to an ever-increasing extent as so-called two-circuit brake systems, of which the two brake circuits consist each of an independent line system with its own wheel brake cylinders and which are adapted to be acted upon by pressure fluid by means of a master brake cylinder constructed as tandem-cylinder and having two separate pressure chambers, and whereby each brake circuit supplies itself a sufficient brake output in order to stop the vehicle in case the other brake circuit fails as a result of a defect in the line system or at a wheel brake cylinder.

Different types of constructions of safety valves are already known for such two-circuit brake installations, which are interconnected into the line systems and serve for shutting off a line branch exhibiting an excessive pressure decrease, whereby the failure of the entire brake circuit is prevented in case of a defect in a line branch. In one type of construction of such a safety valve (British Pat. No. 839,349), a differential piston bridged by a bypass line and acted upon on both sides with the line pressure is interconnected in each line branch, which differential piston under normal operating conditions is retained by the line pressure acting on its larger piston surface and by an abutment in a position releasing the discharge opening of the bypass line. In case of a collapse of the line pressure downstream of the differential piston, the piston is displaced under the effect of the line pressure acting on its smaller piston surface into a closure position closing the discharge opening of the bypass line so that the corresponding line branch is closed off. In a further known type of construction of a safety valve (British Pat. No. 978,933), two pistons are arranged overhung in a cylinder housing on both sides of a central pressure chamber delimited by abutments, which pistons on the one hand act on a fluid volume connected with the line branches so that in case of a pressure increase in the central pressure chamber, a pressure is also built-up in the connected line branches. In case of a failure of one line branch, the piston coordinated thereto is displaced practically without resistance up to its end abutment at the cylinder housing wall, which also brings about a temporary relief of the other piston coordinated to the further line branch; however, the other piston is again acted upon by the full brake pressure as soon as the one piston has reached its end abutment.

With a further type of safety valves for two-circuit brake installations, pistons which are rigidly connected with each other are displaceably arranged in two separated cylinder spaces, whereby at least two mutually opposite piston surfaces are acted upon by the pressure produced by the master brake cylinder and the line branches are so connected to the individual cylinder spaces that an approximately identical fluid pressure prevails in all line branches of the two brake circuits. In one known type of construction of such a safety valve (French Pat. No. 1,391,121), four cylinder spaces which are separated from one another in a fluid-tight manner by means of a double piston and are acted upon with a different fluid pressure diagonally in relation to the respectively connected line branches, are formed in such a manner that a uniform pressure actuation of all connected branch lines as also, in case of failure of a line branch, an equilibrium condition between the remaining line branches is attained. In another known type of construction of a safety valve belonging to this group (U.S. Pat. No. 3,144,920) all line branches of both brake circuits are connected to a cylinder housing and two pistons rigidly connected with each other are displaceably arranged in two cylinder spaces connected with each other by a bore in a partition wall. The pistons are thereby acted upon, on the one hand, with the fluid pressure produced by the master braked cylinder and, on the other, with the reaction pressure of the wheel brake cylinders of one brake circuit whereby the connection of the line branches is made in such a manner that all wheel brake cylinders of both brake systems are initially acted upon with the pressure of the master brake cylinder and the fluid flow to one or the other wheel brake cylinder of one brake circuit is throttled or completely closed off in dependence on the reaction pressure of the corresponding wheel brake cylinder of the other brake circuit in case the pressure in one line branch of the other brake circuit collapses. Auxiliary pistons constructed as needle valves and kept in an equilibrium position by the line pressure or the master brake cylinder pressure are coordinated to the line branches of the other brake circuit, which auxiliary pistons close the line branch in case of a pressure decrease. With the safety valves known heretofore, in addition to a changing brake pedal play, a decrease of the brake output adapted to be applied has to be always accepted which occurs thereby unilaterally in relation to the vehicle and thus has as a consequence the danger of a swerving of the vehicle.

The aim of the present invention now resides in providing a safety installation for two-circuit brake installations of motor vehicles in which a decrease of the overall brake output adapted to be applied as well as a unilateral pulling during the braking is avoided in case of failure of one branch line of a brake circuit.

This aim is solved according to the present invention in that to each brake circuit is coordinated a pressure amplifier element connected in a secondary circuit and a shifting element closing the main flow and in that both elements are automatically adjusted in dependence on the pressure decrease in one of the brake circuits. According to a preferred construction of the present invention the pressure amplifier element is constituted by a stepped or differential piston whose larger and smaller piston surfaces are acted upon with the pressure of one brake circuit and which includes an annular surface that is exposed to the pressure of the other brake circuit, whereby the smaller piston surface is appropriately at most half as large as the larger piston surface and the annular surface corresponds at least to the difference between the large and the small piston surfaces. The shifting element consists of a control piston which in the normal position is exposed to the pressure of both brake circuits and in the closing position is acted upon exclusively with the pressure of one of the pressure amplifier elements. Return springs and end abutments are coordinated to both the differential pistons as also to the control pistons whereby the end abutments of the control pistons cooperate advantageously with electrical contacts that turn on warning lamps indicating the failure of a brake circuit. An advantageous individual realization of this type of construction of the present invention provides that the differential pistons constructed as pressure amplifier elements and the control pistons serving as shifting elements of both brake circuits are accommodated in a common housing connected downstream of the master brake cylinder and that one end surface of the control piston and the annular surface of the differential piston of one brake circuit is connected with the main circuit of the other brake circuit by way of line connections. The control elements may also be accommodated in a housing combined with the master brake cylinder. According to another embodiment of the invention, provision is made that the adjustment of the control pistons closing off the main circuit, takes place by electromagnets which are adapted to be energized in dependence on the pressure decrease in another brake circuit by way of pressure sensors whereby the pressure sensors are constructed as automatically closing contacts, to which are also connected on the other hand the warning lights in the vehicle interior.

By the coordination of a pressure amplifier element connected in a secondary circuit to each brake circuit in conjunction with an ability to close off the main circuit of each brake circuit, the brake pressure in a given brake circuit can be increased, in case of a failure of the other brake circuit, in such a manner that noticeable losses in overall brake output are avoided. Simultaneously, it is achieved thereby for four-piston disk-brake installations that at all wheels a brake power corresponding to the initial brake power remains preserved at the disk brake. The shifting operation necessary therefor is carried out with the aid of the described means in such a manner that no temporary brake-force reduction occurs. As a further advantage of the present invention it should be mentioned that the shifting operation takes place automatically and rapidly whereby also a temporary decrease of the overall brake power is prevented. These advantages are obtained without significant structural expenditures and cost.

Figure 2:
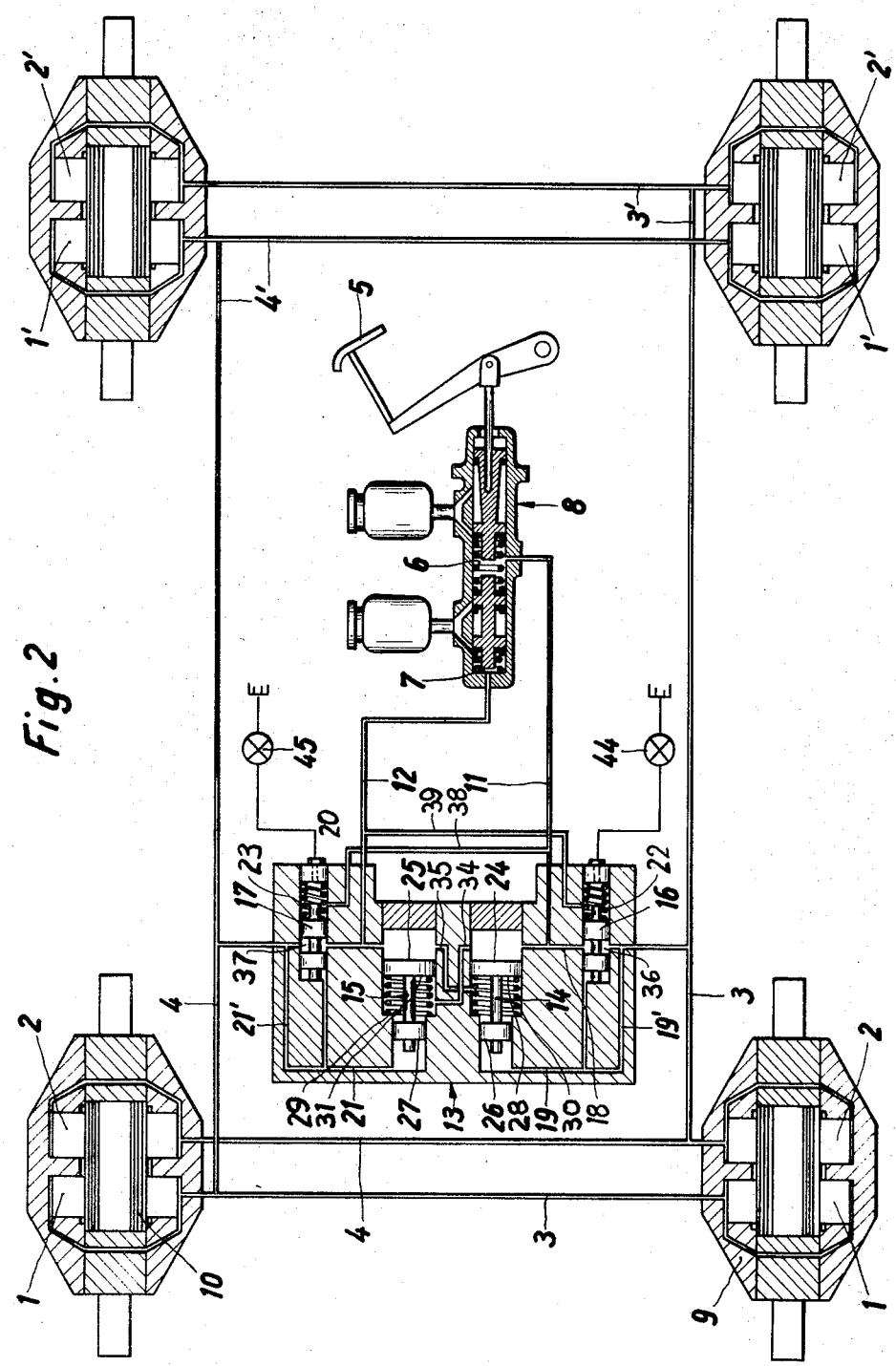
Figure 3:
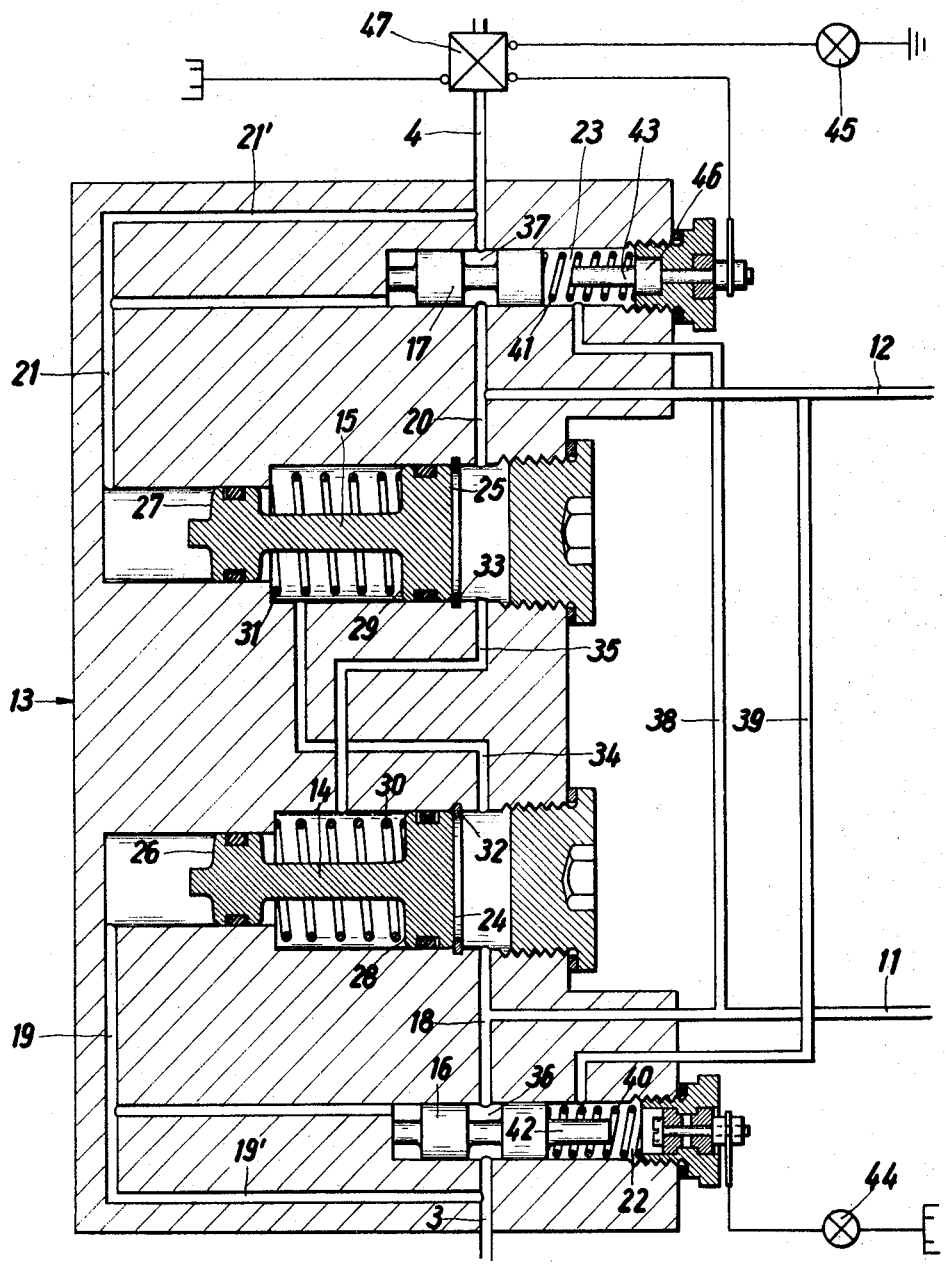

These and other objects, features and advantages of the present invention will become more apparent from the following description when taken in connection with the accompanying drawing which shows, for purposes of illustration only, several embodiments in accordance with the present invention, and wherein:

FIG. 1 is a schematic view of a partial two-circuit brake installation of a motor vehicle equipped with a safety installation according to the present invention, FIG. 2 is a schematic view of a full-two circuit brake installation of a motor vehicle equipped with a safety installation according to the present invention, and FIG. 3 is a longitudinal cross sectional view, on an enlarged scale, through the safety installation of the present invention of the brake installations according to FIGS. 1 and 2.

Referring now to the drawing wherein like reference numerals are used throughout the various views to designate like parts, in the two-circuit brake installation illustrated in FIG. 1, as is utilized in particular for standard drives and front-wheel drives with a brake force distribution of about 2-2.5:1, two mutually independent line systems 3 and 4 forming together with the wheel brake cylinders 1 and 2 one brake circuit each are provided, which are supplied with pressure fluid by a master brake cylinder generally designated by reference numeral 8 which is actuatable by a brake pedal 5 and constructed as tandem cylinder having two separate pressure chambers 6 and 7. The wheel brake cylinders 1 and 2 at the front axle are arranged independently of one another in the brake saddle 9 of the disk brake, pair-wise on both sides of the brake disk and actuate a common brake lining carrier 10. A safety installation according to the present invention and generally designated by reference numeral 13 is interconnected into the brake installation downstream of the master brake cylinder 8 and connected with the pressure chambers 6 and 7 thereof by way of lines 11 and 12. A line 11' is branched off from the line 11 between the master brake cylinder 8 and the safety installation 13, which leads in a known manner to the wheel brake cylinder 1' of the disk brakes coordinated to the rear axle. The safety installation 13 includes for each brake circuit 3 and 4 a differential piston 14 and 15 connected in the secondary circuit and serving as pressure amplifier element and a control piston 16 and 17, closing off the main circuit 11, 3 and 12, 4, respectively. The differential pistons 14 and 15 are arranged in correspondingly constructed cylinder spaces and are connected by way of lines 18, 19', 19 and 20, 21', 21 in the secondary circuit with respect to the main circuit formed by lines 11 and 12 as well as 3 and 4 and the cylinder spaces 22 and 23 receiving the control piston 16 and 17. The differential pistons 14 and 15 have a larger piston surface 24 and 25 and a smaller piston surface 26 and 27 as well as an annular surface 28 and 29, arranged between the two piston surfaces 24, 26 and 25, 27, respectively, and are relieved by a return spring 30 and 31 respectively. In the normal position the differential pistons 14 and 15 abut against end abutments 32 and 33 (see FIG. 3), whereby they are acted upon at their smaller piston surface 26 and 27 and at their larger piston surface 24 and 25 with the prevailing pressure of the same brake circuit and at their annular surface 28 and 29 by way of lines 34 and 35 with the pressure of the main circuit 11 and 12 of the respective other brake circuit. The control piston 16 and 17 includes an annular groove 36 and 37, respectively, by way of which the connection between the two line sections 3 and 11, respectively, 4 and 12 of the main circuit is established or interrupted. The control piston 16 and 17 are exposed by way of lines 38 and 39, on the one hand, to the pressure in the main circuit of one brake circuit and, on the other, to the pressure in the secondary circuit of the other brake circuit. Return springs 40 and 41 (FIG. 3) and end abutments 42 and 43 (FIG. 3) are further coordinated to the control piston 16 and 17. The end abutments 42 and 43 constructed as pin-shaped extensions cooperate with electrical contacts in the cylinder cover, by way of which warning lamps 44 and 45 arranged within the field of vision of the driver, which indicate the failure of the one or other brake circuit, are adapted to be turned-on.

The operation of the safety installation according to the present invention is as follows:

With normally operating brake circuits the same pressure builds up in both line systems 3 and 4 upon actuation of the brake pedal 5, by means of which the brake blocks 10 are caused to produce the abutment braking pressure by way of the wheel brake cylinder 1 and 2. The pressure fluid thereby reaches from the pressure chambers 6 and 7 of the master brake cylinder 8, the line system 3 and 4 by way of the lines 11 and 12 and the annular grooves 36 and 37. Simultaneously, the control pistons 16 and 17 are acted upon by way of the lines 38 and 39 and pressure medium reaches by way of the lines 18, 19 and 20, 21 the larger piston surface 24 and 25 and the smaller piston surface 26 and 27 of the differential pistons 14 and 15, respectively, and by way of the lines 34 and 35, the annular surface 28 and 29 of the differential piston 14 and 15 coordinated to the other brake circuit whereby the differential pistons are held in equilibrium and therewith ineffectual. If now, for example, the brake circuit for the wheel brake cylinder 1 fails, then the pressure in the line system 3 collapses and at the same time the line 11 and the pressure chamber 6 become pressureless. Simultaneously therewith, the pressure in the line 38 and in the cylinder space 23 collapses and the pressure actuation at the annular surface 29 of the differential piston 15 is lifted. As a result thereof, the differential piston 15 slides toward the left in relation to the drawing of FIG. 1 whereby it produces a larger pressure in the line 21 by way of its smaller piston area 27 at a corresponding transmission ratio. The control piston 17 is now displaced by the pressure in the line 21 against the force of the return spring 41 whereby the direct main flow connection between the lines 4 and 12 is interrupted and the higher pressure now prevailing in the line 21 is fed by way of the branch line 21' into the lines 4 of the brake circuit for the wheel brake cylinder 2. As a result of the considerably higher pressure, by means of which the friction lining carriers 10 are pressed thereby against the brake disk, the loss in effective brake power at the front axle is equalized. The failure of the rear wheel brakes unavoidable in case of pressure loss in the brake circuit of the wheel brake cylinder 1 has to be accepted with this cost-saving brake installation. However, with the brake-force distribution described hereinabove, this failure is not decisive. In case of a leak in the brake circuit for the wheel brake cylinder 2 the described shifting operation by means of the control elements 14 and 16 repeats itself whereby the line 39 and the cylinder space 22 as well as the lines 20 and 21 and therewith the differential piston 15 become pressureless with respect to its larger and smaller piston surfaces 25 and 27. Furthermore, the pressure acting on the annular surface 28 of the differential piston 14 collapses so that the differential piston 14 slides toward the left under the effect of the pressure medium acting on its larger piston surface 24 and produces a correspondingly increased pressure in the line 19 by way of its smaller piston surface 26, whereby the control piston 16 is displaced under the effect of this increased pressure in line 19 so that the connection of lines 3 and 11 existing by way of the annular channel is interrupted and now the higher pressure prevailing in the line 19 and 19' is now fed into the line system 3. In that case the rear wheel brake remains fully effective.

In FIG. 2 the safety installation 13 described hereinabove is illustrated for a symmetrically constructed brake installation with four wheel-brake cylinders each per wheel brake. Brakes of this type with a brake force distribution of about 1.6:1 are required for the most part for vehicles whose masses to be braked are accommodated primarily in the rear. The brake installation for the front wheel brake with the wheel brake cylinders 1 and 2, the brake jaw 9 as well as the friction lining carriers 10 was taken over without change from the embodiment according to FIG. 1, using again the same reference numerals. The same is also true for the structural parts of the safety installation 13. The rear wheel brake constructed analogously to the front wheel brake contains the wheel brake cylinder 1' and 2', whose line networks 3' and 4' are connected to the corresponding line system 3 and 4 of the front wheel brakes. In case of failure of one brake circuit, for example, of the circuit for the wheel brake cylinder 1 and 1' the operating cycle between the differential pistons 14 and 15, on the one hand, and the control piston 16 and 17, on the other hand, repeats itself as described in connection with the embodiment of FIG. 1, with the aim that a higher pressure builds up in the brake circuit for the wheel brake cylinder 2 and 2'. The advantage of this construction is that no noticeable loss in brake force output both at the front axle as well as the rear axle has to be accepted. The failure of the one or other brake circuit is thereby indicated by one of the control lights 44, 45.

With otherwise completely similar construction of the safety installation 13 for the brake installations according to FIGS. 1 and 2, electromagnets 46 of conventional construction may be coordinated to the control piston 16 and 17 as illustrated in the upper half of FIG. 3, which electromagnets are adapted to be energized by way of pressure sensors 47 producing electric pulses, which detect the pressure in the line systems 3 and 4. The control piston 16 or 17 are adjusted in a similar manner in dependence on a pressure decrease in the other brake circuit as this takes place in the embodiment without electromagnets (lower drawing half of FIG. 3) by the pressure prevailing in the lines 18 and 20 or the resulting pressure in these lines. The warning light 45 is further connected with the pressure sensor 47.

While I have shown and described several embodiments in accordance with the present invention, it is understood that the same is not limited thereto but is susceptible of numerous changes and modifications as are known to those skilled in the art and I, therefore, do not wish to be limited to the details shown and described herein but intend to cover all such changes and modifications as are encompassed by the scope of the appended claims.

I claim:

1. A safety valve arrangement for controlling brake fluid flow from a plurality of brake fluid input lines to a corresponding plurality of brake fluid output lines which lead to a corresponding plurality of independently actuable wheel brake cylinders at a wheel to be braked; said arrangement comprising:
   first movable differential piston means having oppositely facing first and second differential piston pressure areas and a third differential piston pressure area facing in the same direction as said second differential piston pressure area,
   first and second independently supplied brake fluid input lines,
   first and second output lines for independently supplying brake fluid pressure to respective first and second independently actuable wheel brake cylinders at a wheel to be braked, first line means communicating the first input line to the first output line, first control piston means having oppositely facing first and second control piston pressure areas, said first control piston means being arranged in said first line means and being movable from a first control piston position permitting flow of brake fluid through said first line means to a second control piston position preventing said flow through said first line means, second line means communicating said first input line to said first differential piston pressure area, third line means communicating said first output line with said second differential piston pressure area, fourth line means communicating said third line means with said first control piston pressure area, and fifth line means communicating said second input line to said third differential piston pressure surface area;

wherein said first differential piston means is constructed such that approximately equal fluid pressures in said second, third, and fifth line means maintains said first differential piston means in a first differential piston position with a maximum volume in said third line means, said first differential piston area being larger than said second differential piston area such that a substantial reduction in the fluid pressure in said fifth line means results in movement of said first differential piston means to reduce the volume in said third line means, and wherein said first control piston means is configured for movement to said second control piston position in response to a predetermined reduction in pressure in said second input and output lines such that failure of the circuit containing said second input and output lines is automatically accommodated for by an increase in the pressure in said first output line by means of the closing of the first line means by the first control piston means and by means of the reduction in volume and corresponding increased pressure in said third line means caused by movement of the first differential piston means.

2. An arrangement according to claim 1, further comprising sixth line means communicating said second input line to said second control piston pressure area, wherein said first control piston means is constructed such that approximately equal fluid pressures in said fourth and sixth line means maintains said first control piston means in said first control piston position such that a reduction in fluid pressure in said sixth line means facilitates said movement of said first control piston to said second control piston position.

3. An arrangement according to claim 2, wherein said first differential piston means includes abutment means and spring means for assisting in maintaining said first differential piston means in said first positions.

4. An arrangement according to claim 2, further comprising pressure sensor means for sensing the pressure in said third line means and warning means operatively connected to said pressure sensor means.

5. An arrangement according to claim 2, wherein each of said output lines are parallely connected to a plurality of wheel brake cylinders at a corresponding plurality of wheel brakes.

6. An arrangement according to claim 2, wherein said second input line also leads directly to at least one wheel brake cylinder of a wheel brake at a wheel which is not braked by fluid pressure from said first output line.

7. An arrangement according to claim 2, wherein said third differential piston pressure area is an annular area disposed intermediate the ends of said third differential piston means.

8. An arrangement according to claim 7, wherein said first and second differential piston pressure areas are disposed at opposite ends of said first differential piston means.

9. An arrangement according to claim 2, wherein said first differential piston pressure area is at least twice as large as said second differential piston pressure area.

10. An arrangement according to claim 9, wherein said third differential piston pressure area is approximately equal to the difference in size between the first and second differential piston pressure areas.

11. An arrangement according to claim 2, wherein said first control piston means includes abutment means and spring means for assisting in maintaining said first control piston means in said first position.

12. An arrangement according to claim 11, wherein said first differential piston means includes abutment means and spring means for assisting in maintaining said first differential piston means in said first positions.

13. An arrangement according to claim 11, further comprising electrical contact means engageable with one of said abutment means and spring means for controlling a warning light circuit which indicates failure of the brake circuit connected to said second output line.

14. An arrangement according to claim 2, further comprising second differential piston means and second control piston means and seventh through twelfth line means arranged symmetrically with respect to said first differential piston means, first control piston means, and first through sixth line means for automatically accommodating a failure of the circuit containing said first input and output lines by increasing the pressure in said second output line by means of the closing of a seventh line means leading from said second input line to said second output line by said second control piston means and by means of the reduction in volume and corresponding increased pressure in a ninth line means leading from said second output line to said second differential piston means by movement of the second differential piston means.

15. An arrangement according to claim 14, wherein said first differential piston pressure area is at least twice as large as said second differential piston pressure area, and wherein the respective pressure areas on said second differential pressure means are similarly related.

16. An arrangement according to claim 15, wherein said third differential piston pressure area is approximately equal to the difference in size between the first and second differential piston pressure areas.

17. An arrangement according to claim 14, wherein each of said output lines are parallely connected to a plurality of wheel brake cylinders at a corresponding plurality of wheel brakes.

18. An arrangement according to claim 17, wherein said second input line also leads directly to at least one wheel brake cylinder of a wheel brake at a wheel which is not braked by fluid pressure from said first output line.

19. An arrangement according to claim 17, wherein said plurality of wheel brake cylinders are associated with respective front and rear wheels of a vehicle.

20. An arrangement according to claim 19, wherein said control piston means, said differential piston means, and portions of each of said line means are arranged in a common housing.

21. An arrangement according to claim 14, wherein said second line means extends past said first differential piston area to communicate directly with the pressure surface area on said second differential piston means which corresponds to said third differential pressure area on said first differential piston means.

22. An arrangement according to claim 21, wherein said control piston means, said differential piston means, and portions of each of said line means are arranged in a common housing.

23. An arrangement according to claim 22, wherein each of said control piston means includes abutment means and spring means for assisting in maintaining said control piston means in their respective first non-blocking positions.

24. An arrangement according to claim 23, further comprising electrical contact means engageable with one of said abutment means and spring means for controlling a warning light circuit which indicates failure of the respective brake circuits.

25. An arrangement according to claim 22, further comprising pressure sensor means arranged in each of said output lines, and warning means operatively connected to said pressure sensor means which indicate failure of the respective brake circuits.

* * * * *